United States Patent
Leighton et al.

[11] Patent Number: 5,483,944
[45] Date of Patent: Jan. 16, 1996

[54] METHOD AND APPARATUS FOR METERING FUELS FOR DELIVERY TO AN INTERNAL COMBUSTION ENGINE

[75] Inventors: Sam R. Leighton, Nedlands; Raymond J. Hill, Joondanna, both of Australia

[73] Assignee: Orbital Engine Company (Australia) Pty. Limited, Balcatta, Australia

[21] Appl. No.: 302,773
[22] PCT Filed: Oct. 20, 1992
[86] PCT No.: PCT/AU92/00561
    § 371 Date: Dec. 1, 1994
    § 102(e) Date: Dec. 1, 1994
[87] PCT Pub. No.: WO93/08393
    PCT Pub. Date: Apr. 29, 1993

[30] Foreign Application Priority Data

Oct. 21, 1991 [AU] Australia .................... PK8999

[51] Int. Cl.$^6$ .................................. F02M 23/00
[52] U.S. Cl. ........................................ 123/531
[58] Field of Search ................... 123/531, 533, 123/535; 239/409, 585; 251/129.16

[56] References Cited

U.S. PATENT DOCUMENTS

| | | | |
|---|---|---|---|
| 4,781,164 | 11/1988 | Seeber et al. ............... | 123/533 |
| 4,782,809 | 11/1988 | Kotowski et al. ........... | 123/531 |
| 4,982,716 | 1/1991 | Takeda et al. ............... | 123/531 |
| 5,024,201 | 6/1991 | Kobayashi et al. ......... | 123/531 |
| 5,080,079 | 1/1992 | Yoshida et al. ............. | 123/531 |
| 5,102,054 | 4/1992 | Halvorsen .................... | 239/533.2 |
| 5,123,399 | 6/1992 | Motoyama et al. ......... | 123/531 |
| 5,172,865 | 12/1992 | Takano et al. ............... | 239/408 |
| 5,207,383 | 5/1993 | Hans et al. .................. | 239/409 |

*Primary Examiner*—Raymond A. Nelli
*Attorney, Agent, or Firm*—Nikaido, Marmelstein, Murray & Oram

[57] ABSTRACT

A method and apparatus for metering liquid fuel for delivery to an engine including delivering during each cycle a predetermined quantity of liquid fuel into a control chamber (71) charged with compressed gas, and thereafter, adjusting the quantity of fuel in the control chamber (71) in accordance with the engine load and/or speed to the required quantity per cycle, and discharging the adjusted quantity of fuel from the control chamber to an injection chamber (70) charged with compressed air for delivery to the engine combustion chamber. Conveniently, as the quantity of fuel is maintained in said control chamber (71) under pressure, the adjustment of the quantity of fuel is effected by opening a bleed valve 73 for a time period determined by the quantity of fuel required to be retained for delivery to the engine.

26 Claims, 3 Drawing Sheets

METHOD AND APPARATUS FOR METERING FUELS FOR DELIVERY TO AN INTERNAL COMBUSTION ENGINE

This invention relates to the control of the rate of supply of fuel to an internal combustion engine preferably by direct injection.

With the increasing requirement to reduce the emissions of internal combustion engines, it has been recognised that controls must be introduced in respect of the permitted level of exhaust emissions from a range of engines other than automotive engines, and particularly in regard to marine engines for pleasure craft and engines for motor bikes and motor scooters. There are also trends towards restrictions on fuel consumptions and emissions from various forms of stationary internal combustion engines and equipment employing relatively small capacity internal combustion engines such as lawn mowers.

It has been established that the most effective control of exhaust emissions, particularly in two stroke cycle engines, is attained by directly injecting the fuel into the engine combustion chamber. In automobiles having relatively large capacity engines, it is economically acceptable to provide a sophisticated management system incorporating a high capacity electronic control unit (ECU) programmed to control all aspects of the combustion process including fuel metering, fuel injection and fuel ignition. However, the costs of such engine management systems are too high to permit their use in controlling the operation of low cost small capacity engines such as small marine engines, motorbike and scooter engines and lawnmower engines.

It is therefore the object of the present invention to provide a method and apparatus for the metering of fuel to an internal combustion engine which is effective and reliable in operation and may be manufactured in high volume at a comparatively low cost.

With this object in view, there is provided a method of metering fuel for delivery to an engine combustion chamber comprising during each fuel delivery cycle, delivering a predetermined quantity of fuel into a control chamber in direct communication with an injector chamber charged with a compressed gas to displace fuel therefrom into said injector chamber and to refil the control chamber, and during at least part of the engine operating load range, removing fuel from said control chamber as required to adjust the quantity of fuel displaced from the control chamber to the injector chamber in response to the filling of the control chamber in the next fuel delivery cycle in accordance with the engine fuel demand.

Conveniently the removal of fuel from the control chamber is effected by opening a port in communication with said control chamber, and controlling the open duration thereof to regulate the quantity of fuel removed from the control chamber. Preferably the control chamber is a conduit having a valve controlled entry end communicating with a pressurised fuel source and a permanently open discharge end communicating with the injector chamber, and wherein said valve controlled end is opened to deliver fuel from said pressurised fuel source into said conduit to effect discharge of fuel from the open end of the conduit to the injector chamber.

In one embodiment, after the fuel is delivered to the combustion chamber there is delivered to the injector chamber combustion chamber gases to raise the pressure in the injector chamber to within predetermined limits.

Conveniently, the removal of the fuel from the control chamber is effected between successive deliveries thereto of fuel. Alternatively, the removal of the fuel from the control chamber is effected during the delivery thereto of the fuel.

In one embodiment, the predetermined quantity of fuel is fixed so the same quantity is delivered to the control chamber each combustion chamber cycle independent of the actual engine load and/or speed. In this embodiment, the predetermined quantity is not less than the maximum fuelling rate of the engine, and during cycle a quantity of fuel is removed to reduce the total amount of fuel delivered to that required for the prevailing engine load and speed.

There is also provided by the present invention apparatus for metering fuel for delivery to an engine, a fixed volume control chamber, an injector chamber in direct communication with said control chamber adapted to in-use be charged with a compressed gas, means operable to deliver a predetermined quantity of fuel into said control chamber each cycle to displace fuel therefrom into the injector chamber and thereby refill the control chamber, and means operable during at least part of the engine operating load range to remove fuel from said control chamber as required to adjust the quantity of fuel displacable from the control chamber to the injector chamber for delivery to the combustion chamber when the control chamber is next filled.

The method of metering the liquid fuel for an engine as herein disclosed can be incorporated in the fuel system as disclosed in co-pending International Application No. PCT/AU92/00301 and the disclosure therein is hereby incorporated by reference in this specification. In that co-pending application there is disclosed an integrated fuel and lubricant supply for an internal combustion engine whereby the lubricant is metered in direct relation to the fuel consumption. It is to be understood that when the method of fuel metering herein described is integrated with said prior disclosed fuel and lubricant supply, the fuel removed from the chamber during adjustment of the metered fuel quantity is returned to a location where it will not adversely influence the fuel/lubricant ratio. For example the fuel removed can be returned upstream of the fuel and oil metering pump.

Preferably the gas, in the injector chamber into which the metered quantity of fuel is delivered, is provided from the engine combustion chamber during a portion of the cycle after the delivery of the fuel to the combustion chamber for that cycle. This is achieved by maintaining the injector nozzle open for a period after completion of the delivery of the fuel, and preferably before combustion has commenced.

Preferably the engine is operated without an induction air throttle in what is commonly known as 'unthrottled' operation. This unthrottle operation ensures that the combustion chamber receives a maximum amount of air during all load/speed conditions. Furthermore the absence of an induction air throttle provides for a relatively constant amount of induction air to be supplied to the combustion chamber irrespective of engine load or speed. This relatively constant amount of inducted air ensures that the pressure rise in the combustion chamber prior to ignition does not vary according to engine load or speed. The fact that a maximum amount of air is present in the combustion chamber ensures higher compression pressures are obtained.

One practical arrangement of the invention will now be described with reference to the accompanying drawings, wherein there is illustrated one practical arrangement of the fuel metering system.

Figure 1:
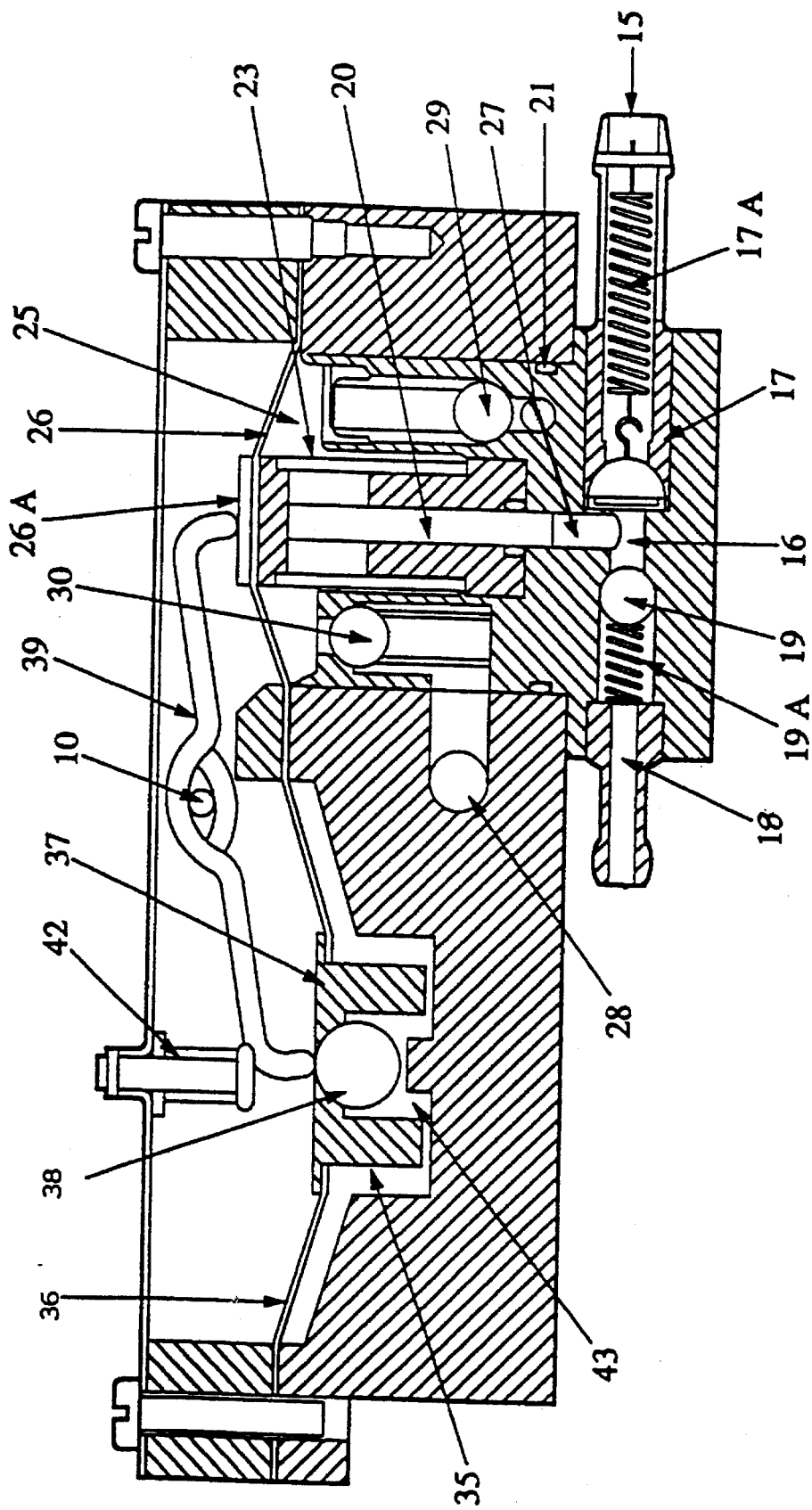
FIG. 1 is a cross-sectional view of a fuel supply and oil metering unit.

Referring now to FIG. 1 of the accompanying drawings, there is shown a cross-sectional view through the fuel and oil pump unit which includes the oil metering device.

The oil entry nipple 15 is connected to an oil reservoir (not shown) to supply oil to the oil gallery 16 via the one-way valve 17. Oil is delivered from the gallery 16 via the nipple 18 under the control of the one-way valve 19. The oil metering rod 20 is a close sliding fit in the pump chamber 21 forming part of the oil gallery 16.

The oil metering rod 20 projects into the fuel supply chamber 25 and is connected centrally to the diaphragm 26 which forms one wall of the fuel chamber 25. The fuel chamber 25 communicates with the fuel supply duct 27 and fuel delivery duct 28 via respective one-way valves 29 and 30 so that movement of the diaphragm 26 will deliver fuel from the fuel chamber 25 to a fuel metering unit to be described further hereinafter. It will be appreciated that, as shown in FIG. 1, the diaphragm 26 is in its extended position so that the fuel chamber 25 is filled to its maximum capacity with fuel and the oil metering rod 20 is in its uppermost position, with the oil gallery 16 filled with oil.

As fuel is consumed by the fuel injection unit, the diaphragm 26 will move downwardly and in turn cause the oil metering rod 20 to also move downwardly. As the metering rod 20 is rigid with the central portion 26A of the diaphragm 26, they each move downwardly in unison and thus oil is displaced from the gallery 16 at a rate directly proportional to the rate of consumption of fuel from the fuel chamber 25. It is thus seen that the mechanism above described provides a very simple, reliable and effective means for the metering of the oil supply to the engine in direct relation to the fuel consumption.

Further construction and operation details of the fuel and oil pump unit as shown in FIG. 1 are provided in the co-pending International Application No. PCT/AU92/00301 previously referred to herein, and the reference numerals shown in FIG. 1 apply to the description shown in said International application. However, some desirable modifications that may be incorporated are replacing the diaphragm 26 with a rolling type diaphragm to provide uniformity of pressure in the fuel chamber 25. Also a vapour bleed passage may be provided in communication with the fuel supply duct 27 to purge fuel vapour back to the fuel supply tank. Further, the fuel and oil supply unit shown in FIG. 1 and described in the above referred to International application is directed to liquid fuels, however, the present invention is not so limited and can be used equally with liquid or gaseous fuel, and also for metering fluids other than fuel.

Figure 2:
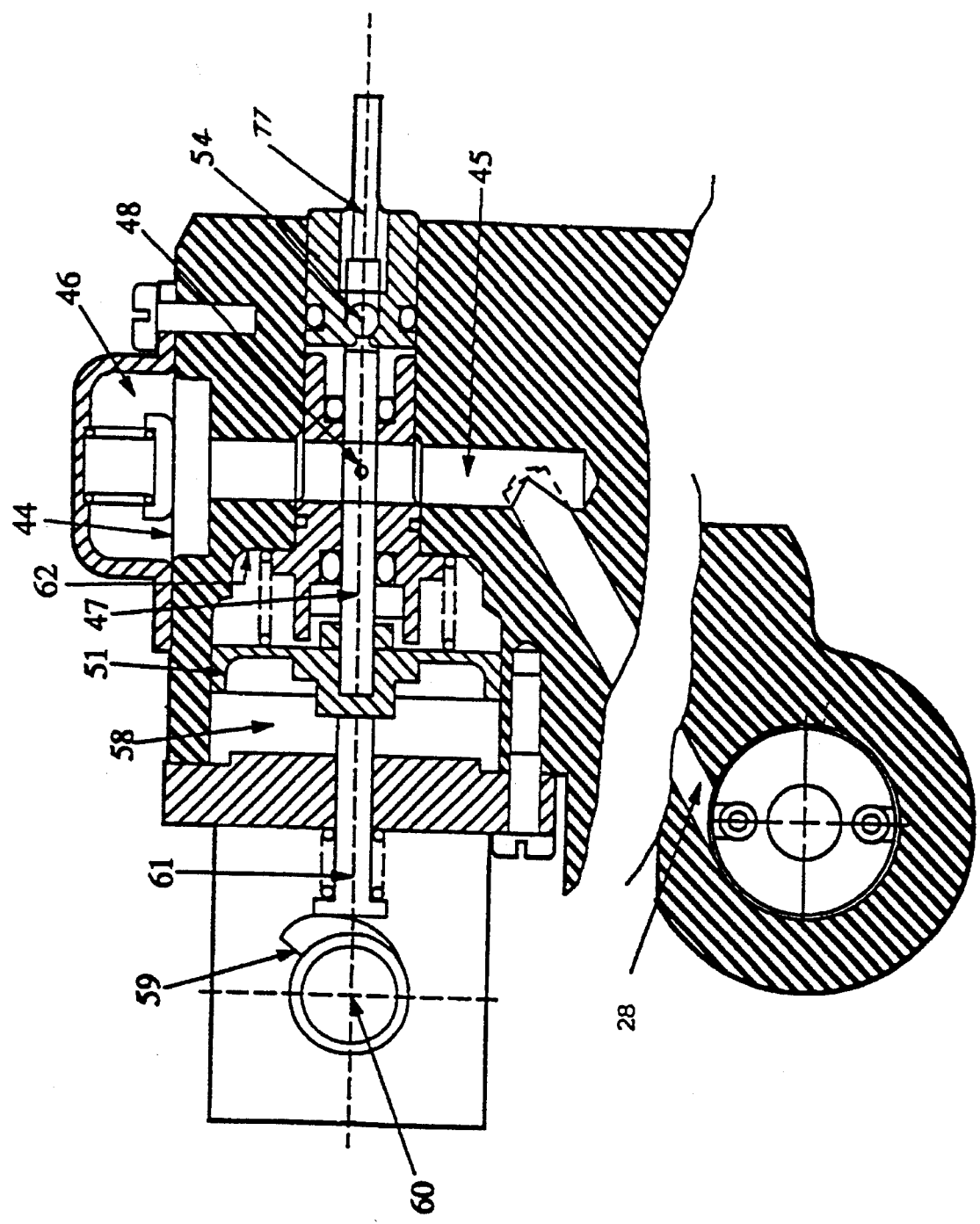
FIG. 2 is a cross-sectional view of the fuel metering unit.
Figure 3:
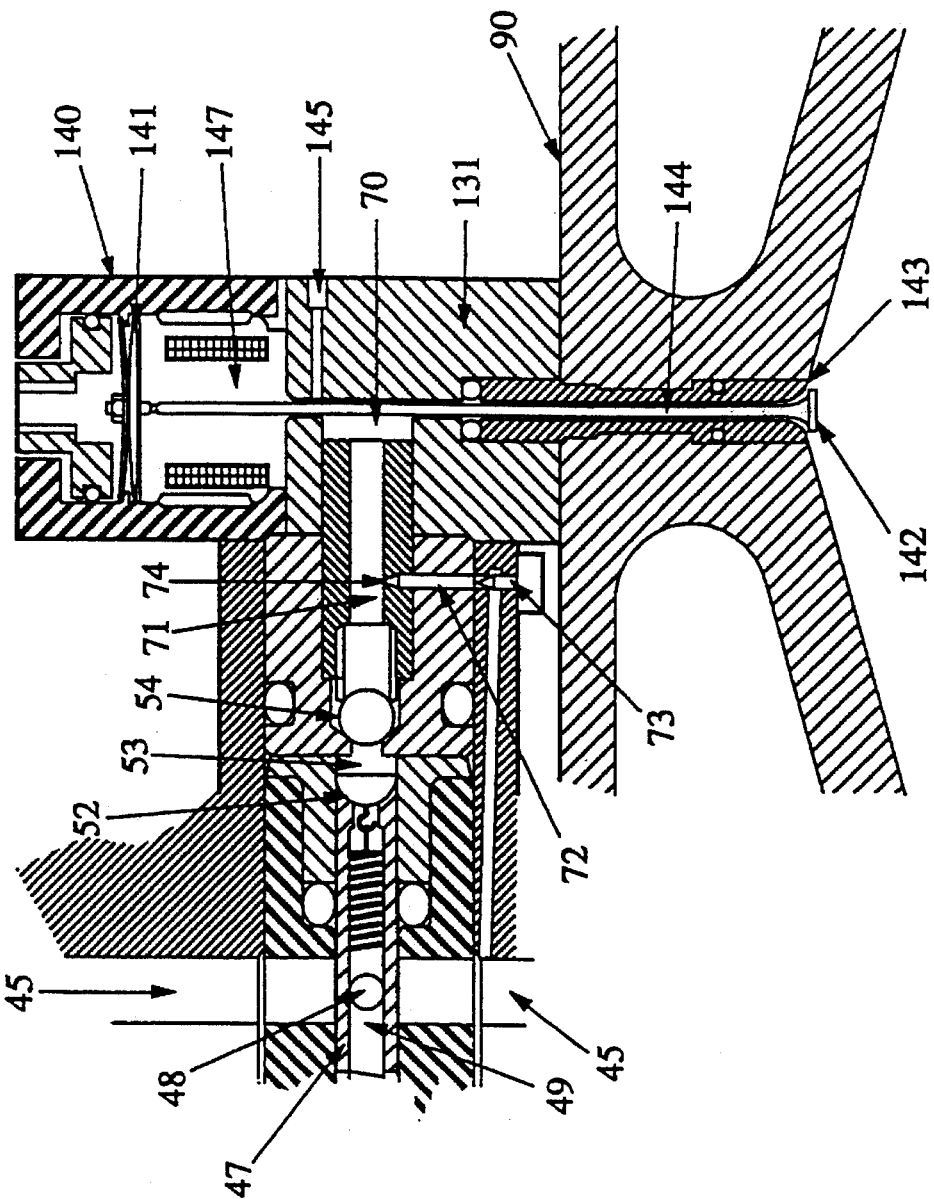
FIG. 3 is an enlarged cross-sectional view of the metering chamber and metering rod portion of the fuel metering unit shown in FIG. 2 and a fuel injector unit.

Referring now to FIGS. 2 and 3, the fuel delivery passage 28 of the fuel and oil pump unit shown in FIG. 1 supplies fuel to the fuel metering assembly 140 formed in the same body. The fuel is delivered to the fuel header chamber 45 having an accumulator 46 to enable the pressure of the fuel in the header chamber 45 to be maintained during the cycle return movement of the diaphragm 26 to maintain metering accuracy and prevent air locks.

Extending through the header chamber 45 is a hollow fuel metering rod 47 having an aperture 48 in the wall thereof to provide continuous communication between the header chamber 45 and the internal cavity 49 in the fuel metering rod 47. The fuel metering rod 47 is closed at the upper end, which is rigid with the piston 51, and at the opposite end has a one-way valve assembly 52 controlling communication between the internal cavity 49 of the metering rod 47 and the fuel metering chamber 53. The one-way valve 54 controls the flow of the fuel from the metering chamber 53 into the fuel delivery passage 71 which conducts the fuel to the injector unit 140.

The piston 51, rigidly connected to the metering rod 47, moves in the cylinder 58 in response to the application of fluid pressure in the cylinder 58. The application of this fluid pressure will displace the piston 51 and the fuel metering rod 47 to the right as seen in FIGS. 2 and 3 and in doing so will cause the one-way valve 52 to close and the one-way valve 54 to open so that the fuel in the fuel chamber 53 is discharged through the fuel delivery passage 71. It will be appreciated that by varying the stroke of the piston 51, and hence of the metering rod 47, the quantity of fuel delivered from the metering chamber 53, each stroke of the metering rod 47, can be varied in accordance with fuel requirements of an engine.

This variation in the metered quantity of fuel delivered can be achieved by the provision of cam 59 rotatably mounted on an axis 60 to co-operate with the piston stop 61 that controls the return position of the piston 51 in the cylinder 58. Thus as the piston stop 61 is moved to the right, as seen in FIG. 2, the stroke of the fuel metering rod 47 is reduced and consequently the quantity of fuel delivered from the fuel metering chamber 53 each stroke is reduced. Operation of the cam 59 can be directly driver controlled, or can be controlled through an appropriate ECU managed means, such as a stepper motor, so that the quantity of fuel delivered to the engine is related to the load and speed of the engine.

Conveniently the fluid supplied to the chamber 58 to actuate the piston 51 can, where the fuel is being supplied to a crankcase scavenged two stroke cycle engine will be compressed air which is derived from the pumping action in the crankcase of the engine via a suitable pressure control device, such as a regulator (not shown). The metered quantity of fuel is delivered to a suitable fuel injector unit, such as shown in FIG. 3 at 140, for timed delivery through a nozzle to the engine combustion chamber in the cylinder head 90.

The fuel injector unit 140 shown in FIG. 3 has an injector chamber 70 to receive the fuel delivered from the metering chamber 53 through the passage 71 and the solenoid actuated valve 143 to control the timing of the delivery of the fuel from the injector chamber 70 to the engine combustion chamber. In operation the injector chamber 70 is charged with gas derived from the engine combustion chamber as hereinafter described, or from a suitable external source through a port such as indicated at 145. The pressure of the gas is sufficient to effect delivery of the fuel when the valve 143 is open via the nozzle 142 to the engine combustion chamber against the compression pressure prevailing therein.

The above referred to fuel metering mechanism can present difficulties in achieving effective control of low fuelling rates such as at or near engine idle. This is particularly so when the varying of the fuelling rate is on an open-loop control system. The problem can be rectified by a closed-loop control system but that is relatively expensive.

Improved metering of fuel can also be achieved by providing a "trimming capability" in conjunction with the metering system above described with reference to FIG. 2 when used with an injector wherein the fuel is delivered into a chamber charged with a gas under pressure, and then delivered to the engine entrained in and propelled by that gas.

It is also possible to extend the trimming capability to effect the complete fuel metering function, thereby avoiding the use of the variable stroke piston 51 previously referred to or other fuel metering means. Further, in the alternative, the trimming capacity can be used in conjunction with other primary fuel metering means.

It will be appreciated that, if the metered quantity of fuel is delivered through a conduit into a chamber, such as the injector chamber 70, charged with gas under pressure, the conduit will be filled with fuel at the termination of delivery of fuel into the conduit and that fuel will remain therein as long as substantially stable conditions prevail. When the injector nozzle, such as 142 opens fuel in the chamber will be delivered to the engine combustion chamber but substantially all of the fuel in the conduit will be retained therein. This retention of the fuel is due to the pressure of the gas in the chamber, the short time interval of injection, the bore size of the conduit and the surface tension of the fuel. These factors are not required to be within specific limits but only in accordance with normal practice in the fuel injector art.

Thus, as the conduit will be filled with fuel at the completion of each delivery of a metered quantity of fuel to the injector chamber, if a part of that quantity of fuel is withdrawn from the conduit, the next delivery of fuel to the injector chamber will be reduced by the quantity of fuel withdrawn from the conduit. It is therefore possible to control or at least trim or adjust the quantity of fuel delivered to the injector chamber by a controlled withdrawal of fuel from the conduit between each delivery to the injector chamber.

Referring now to FIG. 3 of the drawings, the bypass passage 72 communicates the fuel delivery passage 71 with the header chamber 45 via the solenoid actuated valve 73. The orifice 74 in the bypass passage 72 upstream of the valve 73 controls the rate of flow of fuel through the bypass passage 72, when the valve 73 is open, dependent on the pressure differential between the passage 71 and chamber 45.

The fuel delivery passage 71 is configured and disposed so that at the end of the delivery stroke of the metering rod 47 the gas pressure in the injector chamber 70 will trap a quantity of fuel in the fuel delivery passage 71, the balance of the quantity of fuel delivered by the metering rod 47 passing into the injector chamber 70. Upon the valve 73 being opened, fuel will flow at a controlled rate from the fuel delivery passage 71 to the header chamber 45. By varying the period that the valve 73 is open, the quantity of fuel removed from the fuel delivery passage 71 is varied in a controlled manner.

During each delivery stroke of the metering rod 47, a quantity of fuel determined by the stroke of the piston 51 is delivered from the metering chamber 53 into the fuel delivery passage 71. This results in a quantity of fuel being delivered to the injector chamber 70 equal to the quantity delivered to the passage 71 by the piston 51, less the quantity of fuel required to re-fill the fuel delivery passage 71. The injector nozzle 142 is then opened and only that fuel within the injector chamber 70 will be delivered to the engine entrained in the gas from the injector chamber.

After closing of the injector nozzle 142, the valve 73 can be opened to bleed fuel from the passage 71 to effect any necessary correction to the fuel quantity to be delivered on the next injection cycle. If desired the valve 73 may alternatively be opened while the fuel is being delivered to the passage 71.

It is thus seen that by controlling the quantity of fuel withdrawn from the passage 71 each injection cycle, the fuelling rate can be controlled to meet the engine requirements. The valve 73 is under the control of a conventional ECU as commonly used in engine management systems to vary the open period of the valve 73 in accordance with the engine fuel demand as determined by load and speed input signals to the ECU.

The above described bypass system for control of the quantity of fuel delivered to the engine may also be used in conjunction with the variation of the stroke of the metering rod 47 as previously described. In this arrangement the bypass may be used as a means of "trimming" or fine adjustment of the metered quantity of fuel. This combination is particularly convenient in using the bypass system with a fixed stroke of the metering rod 47 to control the fuel at the low range of fuelling rates and the variable stroke of the metering rod 47 to control the high range fuelling rates.

The general construction of the fuel injector 140 will now be described with reference to FIG. 3. The valve 143 is coupled, via a valve stem 144, which passes through the injector chamber 70, to the armature 141 of the solenoid 147 located within the injector body 131. The valve 143 is biased to the closed position by the disc spring 141 and is opened by energising the solenoid 147. The valve 143 is shown in the open position in FIG. 3. Energising of the solenoid 147 is controlled by an ECU, not shown, in timed relation to the engine cycle to effect delivery of the fuel from the injector chamber 70 to a cylinder of an engine.

The fuel chamber 70 is charged with air at a substantially controlled pressure through the port 145 from a suitable pressure regulated source, not shown. By energising of the solenoid 147 the valve 143 is displaced downwardly to open the nozzle 142 so that the metered quantity of fuel held in the fuel chamber 70 is carried by the air charge out of the injector chamber 70 through the nozzle 142 into the combustion chamber of a cylinder of the engine. The timing of the delivery of the fuel to the engine combustion chamber is controlled by timing the energising of the solenoid 147 via an ECU in a known manner.

As an alternative to providing air to the injection chamber 70 from an external source the high pressure gas can be derived from the engine combustion chamber. This can be achieved by maintaining the nozzle 142 open for a period of time after the completion of the injection of the fuel and when the gas pressure in the combustion chamber is above that at the time of injection of the fuel into the combustion chamber. In this way gas (largely air), at a pressure above that in the combustion chamber at the time of injection, is delivered into the injector chamber 70, and trapped therein in preparation to deliver the metered quantity of fuel during the next engine cycle. The nozzle 142 is preferably closed before combustion is commenced or at least before combustion products can enter the fuel chamber 70 and conveniently before ignition of the fuel takes place. The trapping of high pressure gas from the combustion chamber eliminates the need to provide a compressor to supply gas at a pressure sufficient to effect injection of the fuel to the combustion chamber.

The metering of the fuel by the controlling of the quantity of fuel bypassed through a fixed orifice has some inherent corrective characteristics are that advantageous in an engine fuel system.

When the gas pressure in the injector chamber is derived from gas in the combustion chamber passing into the injector, after injection and before combustion, the compression pressure in the combustion chamber is substantially uniform each engine cycle. This is particularly so if the injector nozzle is closed each cycle at a fixed point in the engine compression cycle. Accordingly, when the bypass valve 73 is open, the rate of flow of fuel through the orifice 74 is substantially the same each cycle.

In the event that there was a variation in the compression pressure there would be an automatic compensation to the fuel supply to the engine. In the event that the compression pressure dropped then the rate of fuel flow through the orifice 74 would reduce whereby more fuel would be retained in the passage 71 for delivery to the engine and the torque output would increase. In the event of an increase in compression pressure the flow through the orifice 74 would increase and the torque would reduce.

Further as the engine and/or fuel system condition changes with time, adjustment to the bypass period can be made to compensate for these changes. As the bypass solenoid is controlled by an ECU, such as the conventional engine management ECU, the ECU can be programmed to effect a correction to the open period of the bypass valve 73 upon sensing of a preselected engine parameter. The correction may be over the whole fuelling range or a preselected part thereof with the correction being uniform or variable over the fuelling range.

Throughout this specification, the metering system disclosed has been described as applied to metering fuel to an engine, however, it is to be understood that it has application in other areas where a liquid or gas or a mixture thereof is required to be metered accurately in the form of discrete quantities. This form of metering has many applications such as in chemical processes and in the dosage of medicines for treatment of humans and animals.

In this regard, there is provided a method of metering fluids for cyclic delivery in variable discrete quantities comprising filling a fixed volume control chamber with the fluid each cycle, the control chamber being in direct communication with a dispensing chamber charged with a compressed gas, and then delivering a predetermined quantity of the fluid to the control chamber to displace fluid therefrom into the dispensing chamber, and removing fluid from said control chamber to adjust the quantity of fluid displaced from the control chamber to the dispensing chamber.

There is also provided a suitable apparatus for effecting the metering of fluids for cyclic delivery in variable discrete quantities, that apparatus comprising a fixed volume control chamber to be filled with fluid each cycle and in direct communication with a dispensing chamber adapted in use to be charged with a compressed gas. There is also provided means operable to deliver a predetermined quantity of fluid into said control chamber each cycle to displace a corresponding quantity of fluid therefrom into the dispensing chamber and thereby refill the control chamber. Further, means are provided to remove fluid from said control chamber to adjust the quantity of fluid displaced to the dispensing chamber.

The use of the above method and apparatus for cyclic metering of fluids for general purposes has the advantage of accurate low cost metering which can respond rapidly to changes in quantity demand. The apparatus as previously described with reference to the drawing can be applied to metering fluids other than fuel with limited conversion as would be known to those skilled in the relevant art.

The claims defining the invention are as follows:

1. A method of metering fuel for delivery to an engine combustion chamber comprising during each fuel delivery cycle, delivering a predetermined quantity of fuel into a control chamber in direct communication with an injector chamber charged with a compressed gas to displace fuel therefrom into said injector chamber and to refill the control chamber, and during at least part of the engine operating load range, removing fuel from said control chamber as required to adjust the quantity of fuel displaced from the control chamber to the injector chamber in response to the filling of the control chamber in the next fuel delivery cycle in accordance with the engine fuel demand.

2. A method as claimed in claim 1 wherein said removal of fuel from the control chamber is effected by opening a port in communication with said control chamber, and controlling the open duration thereof to regulate the quantity of fuel removed from the control chamber.

3. A method as claimed in claim 2 wherein the control chamber is a conduit having a valve controlled entry end communicating with a pressurised fuel source and a permanently open discharge end communicating with the injector chamber, and opening said valve controlled end to deliver fuel from said pressurised fuel source into said conduit to effect discharge of fuel from the open end of the conduit to the injector chamber.

4. A method as claimed in claim 3 including returning fuel removed from the control chamber to the pressurised fuel source.

5. A method as claimed in claim 1 wherein the quantity of fuel displaced from the control chamber to the injector chamber is discharged from the injector chamber to the combustion chamber entrained in gas from the injector chamber.

6. A method as claimed in claim 5 including after delivery of the fuel to the combustion chamber, delivering to the injector combustion chamber gases to raise the pressure in the injector chamber to within predetermined limits.

7. A method as claimed in claim 1 wherein said removal of the fuel from the control chamber is effected between successive deliveries thereto of the fuel.

8. A method as claimed in claim 1 wherein said removal of the fuel from the control chamber is effected during the delivery thereto of the fuel.

9. A method as claimed in claim 1 wherein said removal of fuel is effected as a plurality of discrete quantities of fuel each cycle.

10. Apparatus for metering fuel for delivery to an engine combustion chamber comprising, a fixed volume control chamber, an injector chamber in direct communication with said control chamber adapted to in-use be charged with a compressed gas, means operable to deliver a predetermined quantity of fuel into said control chamber each combustion chamber cycle to displace fuel therefrom into the injector chamber and thereby refill the control chamber, and means operable during at least part of the engine operating load range to remove fuel from said control chamber as required to adjust the quantity of fuel displacable from the control chamber to the injector chamber for delivery to the combustion chamber when the control chamber is next filled.

11. Apparatus as claimed in claim 10 wherein the means to remove fuel from the control chamber comprises a selectively openable port in communication with the control chamber, and means to control the open duration of the port to regulate the quantity of fuel removed from the control chamber.

12. Apparatus as claimed in claim 11 wherein said control chamber comprises a conduit having a valve controlled entry port at one end in communication in use with a pressurised fuel source and a permanently open discharge port at the other end communicating with the injector chamber.

13. Apparatus as claimed in claim 10 wherein said means to remove fuel from the control chamber is controlled to effect said removal between successive deliveries thereto of the fuel.

14. Apparatus as claimed in claim 10 wherein said means to remove fuel from the control chamber is controlled to effect said removal during delivery thereto of the fuel.

15. Apparatus as claimed in claim 10 including means to deliver the fuel to the control chamber operable in response to the engine fuel demand to vary the quantity of fuel delivered.

16. Apparatus as claimed in claim 15 wherein the means to deliver the fuel to the control chamber is a variable delivery pump, 17. A method of metering fluids for cyclic delivery in variable discrete quantities comprising each cycle filling a fixed volume control chamber with a fluid, the control chamber being in direct communication with a dispensing chamber charged with a compressed gas, and delivering a predetermined quantity of the fluid to the control chamber to displace fluid therefrom into the dispensing chamber, and removing fluid from said control chamber as required to adjust the quantity of fluid displaced from the control chamber to the dispensing chamber to the required discrete quantity.

18. An apparatus for effecting the metering of fluids for cyclic delivery in variable discrete quantities comprising a fixed volume control chamber to be filled with fluid each cycle in direct communication with a dispensing chamber adapted in use to be charged with a compressed gas, means operable to deliver a predetermined quantity of fluid into said control chamber each cycle to displace a corresponding quantity of fluid therefrom into the dispensing chamber and thereby refill the control chamber, and means to remove fluid from said control chamber as required to adjust the quantity of fluid displaced to the dispensing chamber to the required discrete quantity.

19. A method as claimed in claim 17 wherein said removal of fluid from the control chamber is effected by opening a port in communication with said control chamber, and controlling the open duration thereof to regulate the quantity of fluid removed from the control chamber.

20. A method as claimed in claim 17 wherein said removal of the fluid from the control chamber is effected between successive deliveries thereto of fuel.

21. A method as claimed in claim 17 wherein said removal of fluid from the control chamber is effected during the delivery thereto of the fluid.

22. A method as claimed in claim 17 wherein said removal of fluid is effected as a plurality of discrete quantities of fluid each cycle.

23. A method as claimed in claim 20 wherein said removal of fluid is effected as a plurality of discrete quantities of fluid each cycle.

24. A method as claimed in claim 21 wherein said removal of fluid is effected as a plurality of discrete quantities of fluid each cycle.

25. Apparatus as claimed in claim 18 wherein the means to remove fluid from the control chamber comprises a selectively openable port in communication with the control chamber, and means to control the open duration of the port to regulate the quantity of fluid removed from the control chamber.

26. Apparatus as claimed in claim 18 wherein said control chamber comprises a conduit having a valve controlled entry port at one end in communication in use with a pressurised fluid source and a permanently open discharge port at the other end communicating with the dispensing chamber.

* * * * *